(12) United States Patent
Akiyama et al.

(10) Patent No.: US 10,041,858 B2
(45) Date of Patent: Aug. 7, 2018

(54) DYNAMOMETER CONTROL DEVICE AND METHOD FOR ESTIMATING MOMENT OF INERTIA USING SAME

(71) Applicant: MEIDENSHA CORPORATION, Tokyo (JP)

(72) Inventors: Takao Akiyama, Tokyo (JP); Nobuhiko Asakura, Tokyo (JP)

(73) Assignee: Meidensha Corporation, Tokyo (JP)

( * ) Notice: Subject to any disclaimer, the term of this patent is extended or adjusted under 35 U.S.C. 154(b) by 0 days.

(21) Appl. No.: 15/542,890

(22) PCT Filed: Jan. 8, 2016

(86) PCT No.: PCT/JP2016/050520
§ 371 (c)(1),
(2) Date: Jul. 11, 2017

(87) PCT Pub. No.: WO2016/114233
PCT Pub. Date: Jul. 21, 2016

(65) Prior Publication Data
US 2018/0003589 A1  Jan. 4, 2018

(30) Foreign Application Priority Data

Jan. 13, 2015 (JP) .................................. 2015-004376

(51) Int. Cl.
*G01M 15/04* (2006.01)
*G01M 1/10* (2006.01)

(52) U.S. Cl.
CPC ............ *G01M 15/044* (2013.01); *G01M 1/10* (2013.01)

(58) Field of Classification Search
CPC ....... G01M 15/044; G01M 15/04; G01M 1/10
See application file for complete search history.

(56) References Cited

U.S. PATENT DOCUMENTS

2015/0039246 A1* 2/2015 Takahashi ................ G01L 5/24
702/41
2016/0084735 A1  3/2016 Akiyama et al.

FOREIGN PATENT DOCUMENTS

| JP | 2003-294550 | 10/2003 |
|---|---|---|
| JP | 2006-300683 | 11/2006 |
| JP | 4788543 B | 10/2011 |

(Continued)

*Primary Examiner* — Manuel L Barbee
(74) *Attorney, Agent, or Firm* — Muncy, Geissler, Olds & Lowe, P.C.

(57) ABSTRACT

To provide a dynamometer control device whereby excitation control can be performed so that a resonance phenomenon does not occur even when the moment of inertia of an engine is unknown. A dynamometer control device 6 is provided with an excitation signal generating unit 61 for generating a randomly or periodically fluctuating excitation signal, a speed controller 62 for generating an input signal to a dynamometer whereby a dynamo rotation speed matches a predetermined dynamo command rotation speed, a shaft torque compensator 64 for generating an input signal to the dynamometer whereby vibration of a shaft for connecting an engine and the dynamometer is suppressed using the detection value of a shaft torque sensor, and an adder 65 for generating a torque electric current command signal by adding the input signals generated by the speed controller 62 and the shaft torque compensator 64 to the excitation signal.

5 Claims, 8 Drawing Sheets

(56) References Cited

FOREIGN PATENT DOCUMENTS

| JP | 2011-257205 | 12/2011 | | |
|---|---|---|---|---|
| JP | WO 2013129533 A1 * | 9/2013 | ............... | G01L 5/24 |
| JP | 2014-224722 | 12/2014 | | |

* cited by examiner

DYNAMOMETER CONTROL DEVICE AND METHOD FOR ESTIMATING MOMENT OF INERTIA USING SAME

TECHNICAL FIELD

The present invention relates to a dynamometer control device and a method for estimating the moment of inertia using the same.

BACKGROUND ART

FIG. 8 is a diagram illustrating a configuration of a test system 100 of an engine E using a dynamometer DY. The test system 100 includes: a dynamometer DY connected to an engine E serving as a test piece via a shaft S; a throttle actuator 110 and an engine control device 120 for controlling an output of the engine E; and an inverter 130 and a dynamometer control device 140 for controlling an output of the dynamometer DY. With the test system 100, the torque and speed of the dynamometer DY are controlled by using the dynamometer control device 140, while controlling a throttle opening degree of the engine E by using the engine control device 120, whereby the durability, fuel efficiency and exhaust gas purification performance of the engine E are evaluated. With the test system 100, in some cases, the moment of inertia of the engine E is measured prior to performing the test to evaluate the performance as described above, and is utilized as a control parameter in torque control and speed control in relation to the dynamometer control device 140.

Patent Document 1 discloses a method for estimating the moment of inertia of the engine E by using a device configuring the test system 100 as described above. With the method of Patent Document 1, the dynamometer control device 140 performs excitation control of the torque acting on the shaft S, while maintaining the rotation speed of the engine E constant by using the engine control device 120. Outputs of the shaft torque sensor 160 and the rotation speed detector 150 under such excitation control are acquired by way of the arithmetic device 170, and a value of the moment of inertia of the engine E is estimated by using the data acquired. In general, the engine E has a mechanical loss depending on the rotation speed. In contrast, according to the method of Patent Document 1, the moment of inertia of the engine E is estimated while maintaining the rotation speed substantially constant, therefore, such a mechanical loss does not need to be taken into account.

Patent Document 1: Japanese Unexamined Patent Application, Publication No. 2006-300683

DISCLOSURE OF THE INVENTION

Problems to be Solved by the Invention

Meanwhile, engine torque will vibrate at a frequency depending on the rotation speed. For example, in a typical four-stroke engine, vibratory torque occurs at a frequency that is 2N times the rotation speed (N is a natural number). On the other hand, a resonance frequency of about, for example, 100 Hz exists in a mechanical system that is configured by connecting the engine E and the dynamometer DY. This resonance frequency is included in a frequency domain of vibratory torque which is generated in the engine E operated in an ordinary rotation speed domain (hundreds to thousands rpm). Therefore, based on the method of Patent Document 1, when a value of the moment of inertia of the engine E is tried to be estimated while performing excitation control by way of the dynamometer control device 140, the amplitude of vibration of the shaft torque or engine speed may become larger than necessary due to a resonance phenomenon, depending on the combination of the engine speed and resonance frequency, and the accuracy of estimating the moment of inertia may be reduced.

Note that if a resonance frequency is identified in advance, a resonance phenomenon as described above can be suppressed, by determining an engine speed so as to sufficiently separate the frequency of vibratory torque from the resonance frequency. However, if a value of the moment of inertia of the engine is unknown, the resonance frequency is also unknown in many cases; therefore, an appropriate engine speed cannot be determined when estimating a value of the moment of inertia.

Note that, as a method for suppressing a resonance phenomenon, it has been known that a dynamometer control device is designed by using a robust control design method such as μ synthesis or H ∞ control. However, such a control design method requires a value of the moment of inertia of the engine at a design stage, and therefore cannot be applied to designing a dynamometer control device used for estimating the moment of inertia.

An object of the present invention is to provide a dynamometer control device, and a method for estimating the moment of inertia by using the dynamometer control device, which are capable of performing excitation control such that a resonance phenomenon will not occur, even if the moment of inertia of a test piece is unknown.

Means for Solving the Problems (1) In order to achieve the above-mentioned object, the present invention provides a dynamometer control device (e.g., dynamometer control device 6 to be described later) that generates a torque current command signal to a dynamometer (e.g., dynamometer D to be described later) connected to a test piece (e.g., engine E to be described later) via a shaft (e.g., shaft S to be described later), in which the dynamometer control device includes: a rotation speed detector (e.g., encoder 8 to be described later) that detects a rotation speed of the dynamometer; a shaft torque sensor (e.g., shaft torque sensor 7 to be described later) that detects shaft torque acting on the shaft; an excitation signal generation unit (e.g., excitation signal generation unit 61 to be described later) that generates a randomly or periodically fluctuating excitation signal; a speed controller (e.g., speed controller 62 to be described later) that generates an input signal to the dynamometer such that a detection value of the rotation speed detector matches a predetermined command rotation speed; a shaft torque compensator (e.g., shaft torque compensator 64 to be described later) that generates an input signal to the dynamometer such that vibration of the shaft is suppressed by using the detection value of the shaft torque sensor; and an adder (e.g., adder 65 to be described later) that generates a torque current command signal by adding input signals generated by way of the speed controller and the shaft torque compensator to the excitation signal.

(2) In this case, it is preferable that the shaft torque compensator generates an input signal to the dynamometer by passing a detection signal of the shaft torque sensor through a high-pass filter or bandpass filter, in which a passband of the high-pass filter or bandpass filter includes a resonance frequency of a mechanical system including the test piece and the dynamometer.

(3) In this case, it is preferable that the control device further includes a low-pass filter (e.g., low-pass filter 63 to be described later) that attenuates a resonance frequency component of the mechanical system including the test piece and the dynamometer, from an output signal of the speed controller.

(4) In this case, it is preferable that the speed controller generates an input signal to the dynamometer, in accordance with an I-P control law characterized by a proportional gain Kp and an integral gain Ki, in which a detection value of the rotation speed detector and the command rotation speed are inputs, the low-pass filter is characterized by a cut-off frequency $\omega LPF/2\pi$, and the proportional gain Kp, the integral gain Ki, and the cut-off frequency $\omega LPF/2\pi$ are defined so as to satisfy the following formula (1). Here, in the following formula (1), J is a sum of the moments of inertia of the dynamometer and the test piece, or an estimated value thereof, and $\omega c$ is a positive real number.

$$Kp = J \cdot \omega c, Ki = (J \cdot \omega c^2)/3, \omega LPF = 3\omega c \quad (1)$$

(5) In order to achieve the above-mentioned object, the present invention provides an inertia moment estimation method for estimating a value of the moment of inertia of an engine by using a test system including: a dynamometer (e.g., dynamometer D to be described later) that is connected to an engine (e.g., engine E to be described later) serving as a test piece via a shaft (e.g., shaft S to be described later); a dynamometer control device (e.g., dynamometer control device 6 to be described later) that controls an output of the dynamometer; an engine control device (e.g., engine control device 5 to be described later) that controls an output of the engine; a shaft torque sensor (e.g., shaft torque sensor 7 to be described later) that detects shaft torque acting on the shaft; and a rotation speed detector (e.g., encoder 8 to be described later) that detects a rotation speed of the dynamometer. This estimation method includes: an excitation control step (e.g., S1 of FIG. 3) of performing excitation control of output torque of the dynamometer by way of the dynamometer control device, while maintaining the rotation speed of the engine at a predetermined target rotation speed by way of the engine control device; a data acquisition step (e.g., S1 of FIG. 3) of acquiring detection values of the shaft torque sensor and the rotation speed detector for a predetermined time frame, while performing the excitation control step; a transfer function calculation step (e.g., S2 of FIG. 3) of calculating a transfer function, in which the shaft torque is an input and the rotation speed is an output, by using data acquired in the data acquisition step; and an estimation step (e.g., S3 to S5 of FIG. 3) of estimating a value of the moment of inertia of the engine by using the transfer function calculated in the transfer function calculation step. In the excitation control step, the excitation control is performed by using a control device, described in any one of (1) to (4) above, as the dynamometer control device.

Effects of the Invention (1) According to the present invention, an input signal generated by way of the speed controller such that the rotation speed of the dynamometer matches a predetermined command rotation speed, and an input signal generated by way of the shaft torque compensator such that the vibration of the shaft is suppressed, are added to a randomly or periodically fluctuating excitation signal, whereby a torque current command signal to perform excitation control of the dynamometer is generated. If simply performing excitation control of a dynamometer alone, inputting an excitation signal into the dynamometer would be sufficient. On the other hand, according to the present invention, rotation speed control of the dynamometer is performed by using the speed controller and the shaft torque compensator, whereby excitation control can be performed such that the rotation speed and the shaft torque of the dynamometer will not significantly fluctuate due to a resonance phenomenon as described above. Further, according to the present invention, the speed controller and the shaft torque compensator are used, whereby a resonance phenomenon can be suppressed, without identifying the moment of inertia of the test piece in advance.

(2) According to the present invention, a detection signal of the shaft torque sensor is passed through the high-pass filter or bandpass filter, a passband of which is set up to include a resonance frequency, and is superposed onto an input to the dynamometer, whereby the shaft torque can be prevented from significantly vibrating near the resonance frequency. Note that, as described above, when a value of the moment of inertia of the test piece is unknown, the true resonance frequency is also unknown, in many cases. However, since a passband of a filter is allowed to have an allowance of amplitude to some extent, even if an exact value of the resonance frequency is unknown, a filter to achieve sufficient effects can be designed.

(3) According to the present invention, a resonance frequency component is attenuated from an output signal of the speed controller by using a low-pass filter. As a result, rotation speed control of the dynamometer by way of the speed controller can be prevented from interfering with the resonance of the mechanical system.

(4) According to the present invention, the proportional gain Kp and the integral gain Ki included in the speed controller are associated with the cut-off frequency $\omega LPF/2\pi$ included in the low-pass filter, by the formula (1) using J that is a sum of the moments of inertia of the dynamometer and the test piece, or an estimated value thereof. The formula (1) is a triple root of a characteristic polynomial of a transfer function of a closed-loop system, in a case in which the mechanical system having the test piece and the dynamometer coupled via the shaft is modelled based on a rigid body having the moment of inertia J. Therefore, by defining the coefficients Kp, Ki and $\omega$ LPF as in the formula (1), the speed controller can be prevented from vibrationally operating.

(5) According to the present invention, a value of the moment of inertia of the engine serving as a test piece is estimated by performing the excitation control step, the data acquisition step, the transfer function calculation step, and the estimation step. In particular, according to the present invention, excitation control of the dynamometer is performed by using the dynamometer control device including the speed controller and the shaft torque compensator as described above, whereby a resonance phenomenon can be suppressed regardless of the engine control device side setting of a target rotation speed, therefore, a value of the moment of inertia of the engine can be estimated with a high degree of accuracy.

PREFERRED MODE FOR CARRYING OUT THE INVENTION

Figure 1:
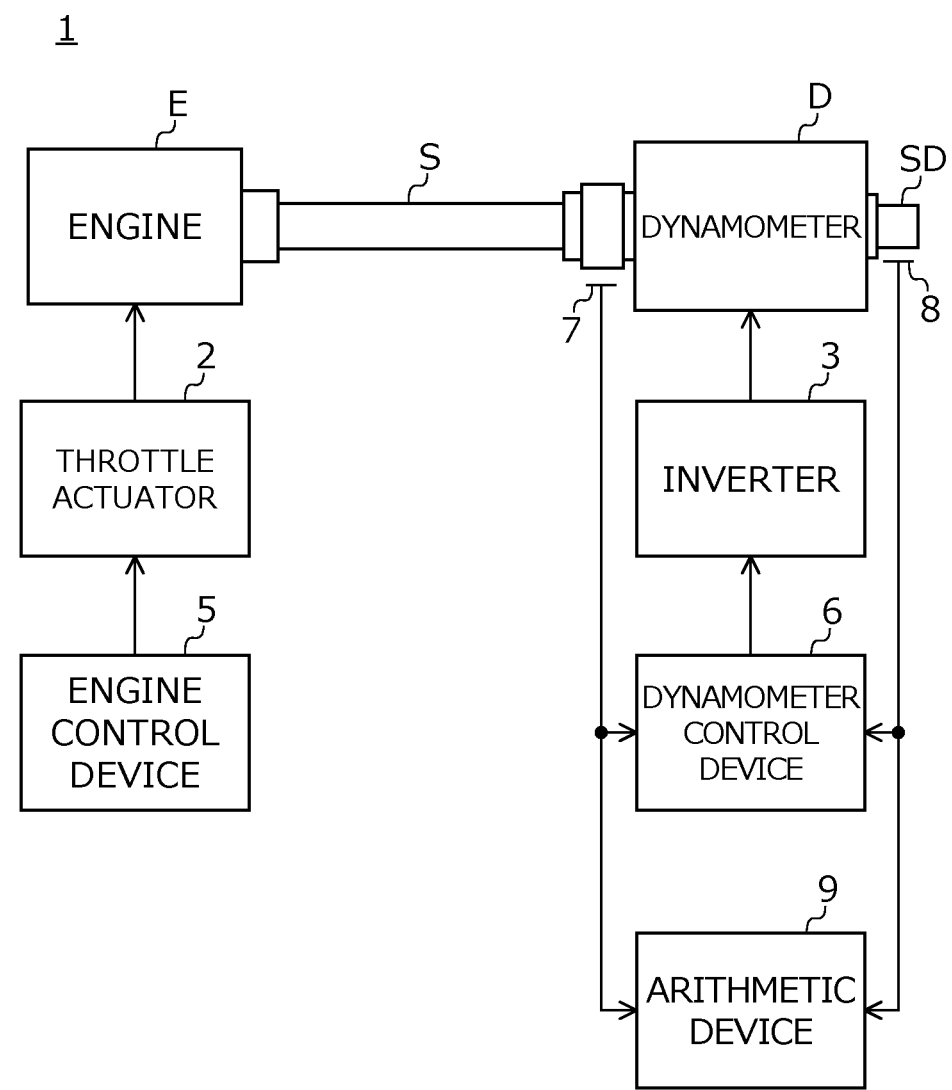
FIG. 1 is a diagram illustrating a configuration of a test system according to an embodiment of the present invention.

An embodiment of the present invention will hereinafter be described in detail with reference to the attached drawings. FIG. 1 is a diagram illustrating a configuration of a test system 1 according to the present embodiment.

The test system 1 includes: an engine E that serves as a test piece; a dynamometer D that is connected to the engine E via a substantially rod-shaped shaft S; an engine control device 5 that controls an output of the engine E via a throttle actuator 2; an inverter 3 that supplies electric power to the dynamometer D; a dynamometer control device 6 that controls an output of the dynamometer D via the inverter 3; a shaft torque sensor 7 that detects torsional torque of the shaft S (hereinafter referred to as "shaft torque"); an encoder 8 that detects rotation speed of an output shaft SD of the dynamometer D (hereinafter referred to as "dynamometer rotation speed"); and an arithmetic device 9 that performs various arithmetic operations by using outputs of the shaft torque sensor 7 and the encoder 8.

With the test system 1, while controlling the throttle opening degree of the engine E by using the engine control device 5, the torque and speed of the dynamometer DY are controlled by using the dynamometer control device 6, whereby a test to evaluate the durability, fuel efficiency and exhaust gas purification performance of the engine E is performed. In the following description, attention is focused on a function to estimate the moment of inertia of the engine E among various functions realized by the test system 1; in particular, a configuration in relation to such estimation of the moment of inertia will mainly be described in detail.

The engine control device 5 starts the engine E at predetermined timing, and subsequently controls an output of the engine E via the throttle actuator 2 in a predetermined manner.

The dynamometer control device 6 generates a torque current command signal to the dynamometer D in a manner defined in accordance with the test. The inverter 3 supplies electric power to the dynamometer D, based on the torque current command signal generated by way of the dynamometer control device 6, whereby the dynamometer D generates torque in accordance with the command signal.

The arithmetic device 9 controls an output of the engine E by using the engine control device 5, simultaneously records data on the shaft torque detected by way of the shaft torque sensor 7 and the dynamometer rotation speed detected by way of the encoder 8, while controlling an output of the dynamometer D by using the dynamometer control device 6, and estimates the moment of inertia of the engine E by using the data thus recorded. Specific steps of arithmetic operations by the arithmetic device 9 to estimate the moment of inertia of the engine E will be described later with reference to FIG. 3.

Figure 2:
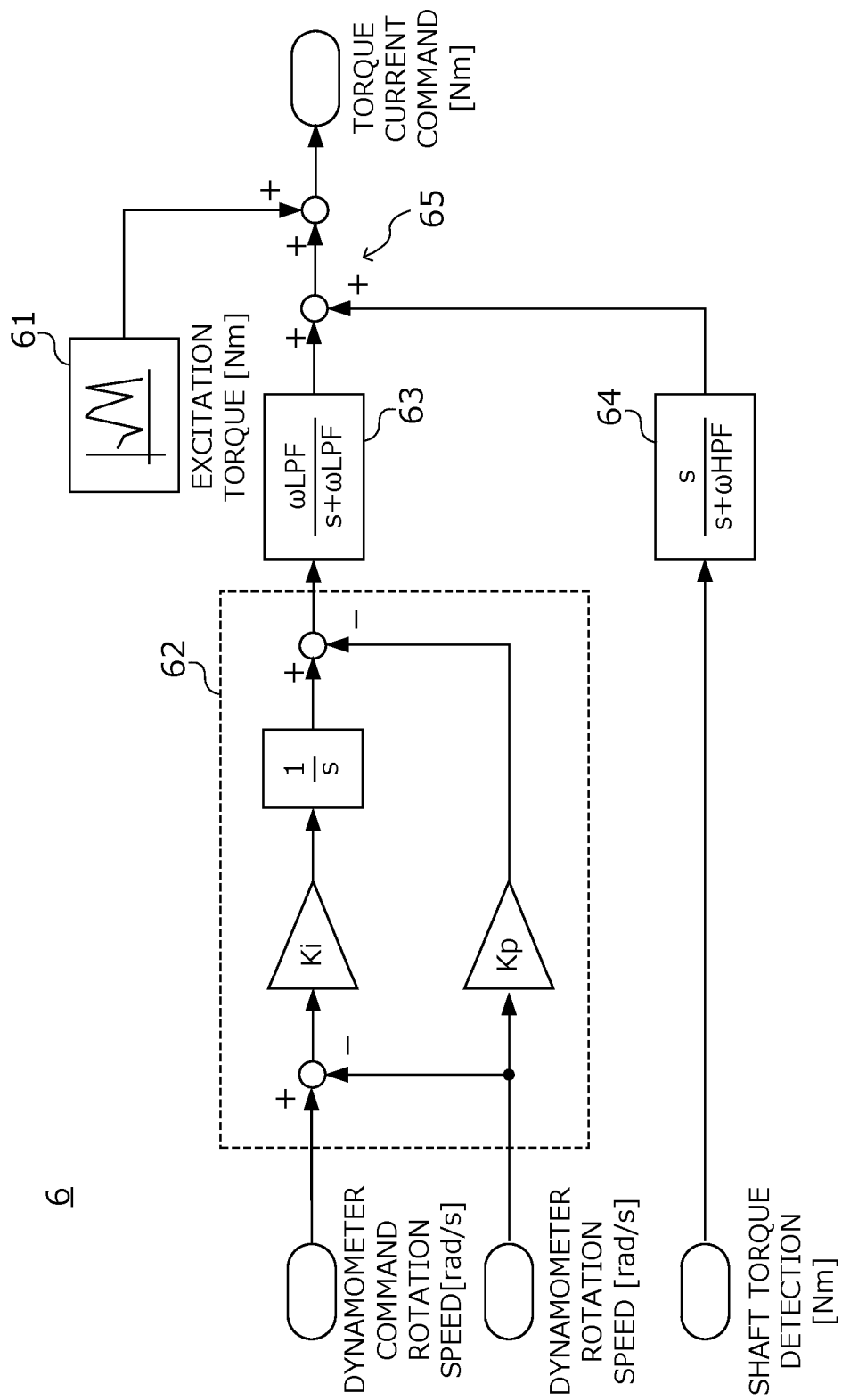
FIG. 2 is a diagram illustrating a configuration of a control circuit of a dynamometer control device according to the embodiment.

FIG. 2 is a diagram illustrating a configuration of a control circuit of the dynamometer control device 6 according to the present embodiment. The control circuit illustrated in FIG. 2 is a control circuit for performing excitation control of vibrating the shaft torque, and is preferably used for, in particular, estimating a value of the moment of inertia of the engine E.

The dynamometer control device 6 includes an excitation signal generation unit 61, a speed controller 62, a low-pass filter 63, a shaft torque compensator 64, and an adder 65.

The excitation signal generation unit 61 generates an excitation torque signal in order to perform excitation control of the shaft torque. The excitation torque signal is implemented by using, for example, a normal random number generated under a predetermined standard deviation. Further, the excitation torque signal may also be implemented by using a sine wave that periodically fluctuates under a predetermined amplitude and frequency.

The speed controller 62 generates an input signal to the dynamometer such that the dynamometer rotation speed detected by way of the encoder matches a predetermined command rotation speed, by using a dynamometer rotation speed and a command rotation speed thereof, in accordance with a known control law. More specifically, as illustrated in FIG. 2, it is preferable for the speed controller 62 to generate an input signal in accordance with an I-P control law characterized by a proportional gain Kp and an integral gain Ki. Note that a specific setup of the gains Kp and Ki will be described later.

The low-pass filter 63 attenuates a frequency component higher than a cut-off frequency $\omega LPF/2\pi$, from an output signal of the speed controller 62. A transfer function of the low-pass filter 63 is implemented by using, for example, a first-order transfer function characterized by the cut-off frequency $\omega LPF/2\pi$, as illustrated in FIG. 2. In order to attenuate a resonance frequency component of a mechanical system including the engine and the dynamometer, from an input signal, the cut-off frequency $\omega LPF/2\pi$ is set lower than the resonance frequency (for example, approximately 100 Hz). As a result, rotation speed control of the dynamometer by way of the speed controller 62 can be prevented from interfering with the resonance of the mechanical system. Note that a specific setup of the cut-off frequency $\omega LPF/2\pi$ will be described later.

By using a detection value of the shaft torque sensor, the shaft torque compensator 64 generates an input signal to the dynamometer so as to suppress vibration of the shaft that connects the engine and the dynamometer. More specifically, the transfer function of the shaft torque compensator 64 is composed of a first-order high-pass filter characterized by a cut-off frequency $\omega HPF/2\pi$, as illustrated in FIG. 2. In order to allow at least the resonance frequency component in the detection value of the shaft torque sensor to pass, the cut-off frequency $\omega HPF/2\pi$ is set lower than the resonance frequency. The cut-off frequency $\omega HPF/2\pi$ of the shaft torque compensator 64 is set to, for example, 1 (where $\omega HPF=2\pi$). Note that the shaft torque compensator 64 may not be limited to the high-pass filter as described above, and may be implemented by using a bandpass filter that is set up to allow at least the resonance frequency component in the detection value of the shaft torque sensor to pass.

The adder 65 adds an input signal from the speed controller 62 after passing through the low-pass filter 63, and an input signal from the shaft torque compensator 64, to the excitation torque signal generated by way of the excitation signal generation unit 61, thereby generating a torque current command signal to the dynamometer.

Next, a description is provided for specific setup values of the gains Kp and Ki of the speed controller 62, and the cut-off frequency ωLPF/2π of the low-pass filter 63. Assume that: the excitation signal generation unit 61 and the shaft torque compensator 64 are excluded from the dynamometer control device of FIG. 2; a rigid body, a torque current command signal which is characterized by a sum J of the moments of inertia of the dynamometer and engine, is driven; and a rotation speed of the rigid body is input as a dynamometer rotation speed into the control circuit. In this case, the characteristic polynomial of the transfer function of the closed-loop system is represented by the following formula (2).

$$s^3 + \omega LPF \cdot s^2 + (Kp \cdot \omega LPF/J) \cdot s + Ki \cdot \omega LPF/J \quad (2)$$

The proportional gain Kp, the integral gain Ki and the cut-off frequency ωLPF/2π, which are defined by the following formula (3), will provide a triple root of the above-described characteristic polynomial (2). Here, ωc is an arbitrary positive real number, and is, for example, 2π. That is to say, by setting values of the parameters Kp, Ki and ωLPF of the control circuit as in the following formula (3), the speed controller 62 can be prevented from vibrationally operating.

$$Kp = J \cdot \omega c, Ki = (J \cdot \omega c^2)/3, \omega LPF = 3\omega c \quad (3)$$

Note that, as described above, the dynamometer control device of FIG. 2 is preferably used when estimating the moment of inertia of the engine. That is to say, when setting the values of these gains, it is assumed that the true value of the moment of inertia of the engine is unknown, and it is therefore assumed that a sum J of the moments of inertia of the engine and the dynamometer in formula (3) above is also unknown. In this case, for all of the moments of inertia J, the estimated value described below is used, which is calculated by using, for example, a known moment of inertia J2 of the dynamometer, an assumed minimal value J1L of the moment of inertia of the engine, and an assumed maximum value J1H of the moment of inertia of the engine. That is to say, the control parameters of the dynamometer control device of FIG. 2 can be adjusted without using the moment of inertia of the engine.

$$J = \sqrt{J1L \cdot J1H} + J2 \quad (4)$$

Figure 3:
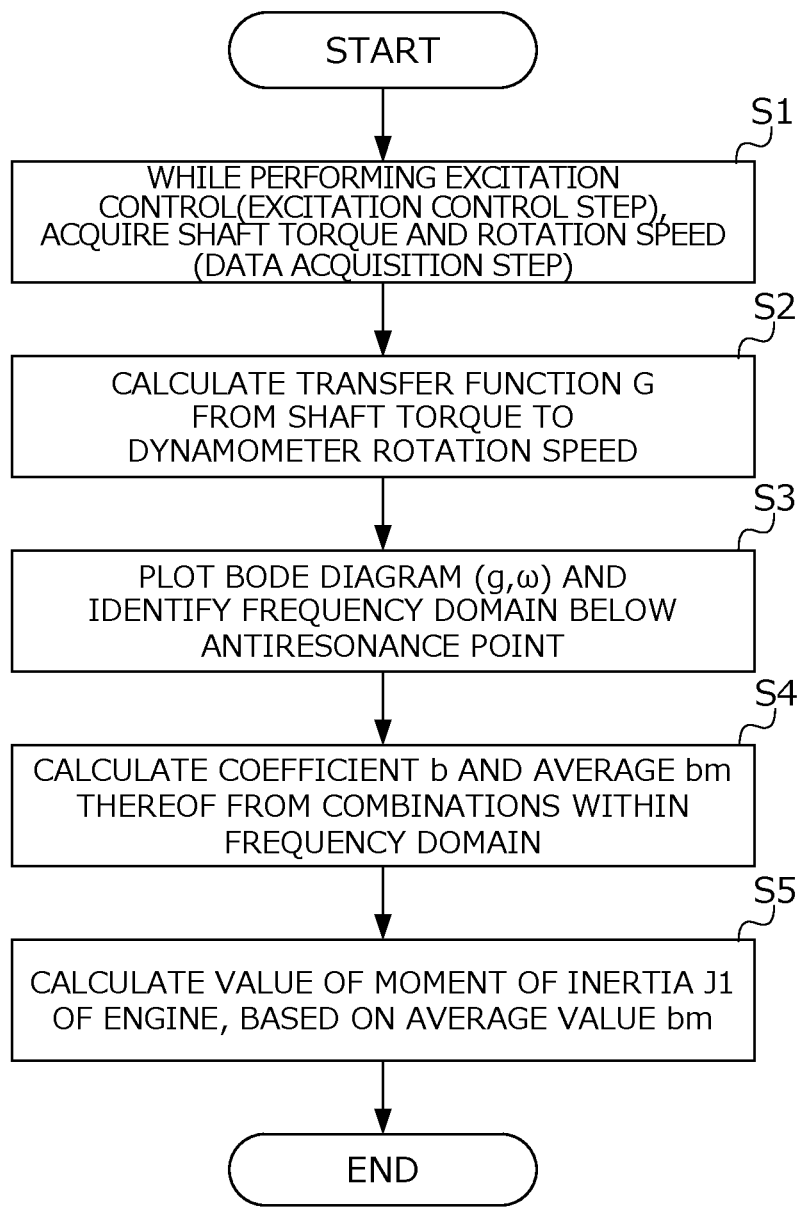
FIG. 3 is a flowchart illustrating the steps of estimating the moment of inertia of an engine.

Next, a description is provided for the steps of estimating the moment of inertia of the engine E by using the test system 1 as configured above. FIG. 3 is a flowchart illustrating the steps of estimating the moment of inertia of the engine.

Firstly, in S1, while maintaining the rotation speed of the engine at a predetermined target rotation speed by way of the engine control device, the dynamometer control device of FIG. 2 simultaneously performs excitation control of the output torque of the dynamometer (excitation control step). Further, in S1, while performing the excitation control step, the shaft torque detected by way of the shaft torque sensor and the dynamometer rotation speed detected by way of the encoder are acquired for a predetermined time frame (for example, dozens of seconds) (data acquisition step).

Note that the target rotation speed of the engine in the excitation control step is arbitrary. Further, a command rotation speed of the dynamometer to be input into the speed controller of the dynamometer control device is set to the same value as the arbitrarily set target rotation speed of the engine.

Next, in S2, by using data of the shaft torque and the dynamometer rotation speed acquired in S1, a transfer function G(s) is calculated, in which the shaft torque is an input, and the dynamometer rotation speed is an output (transfer function calculation step). The transfer function G(s) is derived by calculating a transfer function G_SHT(s), in which the excitation torque signal of the dynamometer control device is an input and the shaft torque is an output, and a transfer function G_DYw(s), in which the excitation torque signal of the dynamometer control device is an input and the dynamometer rotation speed is an output, and performing division of these functions (G(s)=G_DYw(s)/G_SHT(s)).

Next, in S3, a Bode diagram illustrating the gain characteristics of the transfer function G(s) derived is plotted, and a frequency domain used for estimating the moment of inertia of the engine is identified from the Bode diagram. The frequency domain used for estimating this moment of inertia is a frequency domain lower than the frequency calculated by multiplying an antiresonant frequency ωARF at the antiresonance point, where the gain sharply decreases, by a predetermined coefficient K that is 1 or below (for example, about 0.3).

Next, in S4, in the Bode diagrams plotted, by using a plurality of combinations (g, ω) of the gain g and frequency ω within the frequency domain identified in S3, a coefficient b defined by the following formula (5) and an average value bm of all of the combinations (g, ω) of the coefficient b are calculated.

$$b = 20 \log_{10}\left(\frac{|g|\omega}{2\pi}\right) \quad (5)$$

Next, in S5, a value of the moment of inertia J1 of the engine is calculated by the following formula (6) using the average value bm calculated in S4.

$$J1 = \frac{10^{(-bm/20)}}{2\pi} \quad (6)$$

Note that detailed processes, modification, etc. of steps S2 to S5 are disclosed in Japanese Unexamined Patent Application, Publication No. 2006-300683 filed by the Applicant of the present application; therefore, a further detailed description thereof is omitted herein.

Here, a description is provided for the effects by performing the excitation control using the dynamometer control device illustrated in FIG. 2, when estimating the moment of inertia of the engine in accordance with the steps illustrated in FIG. 3.

Figure 4:
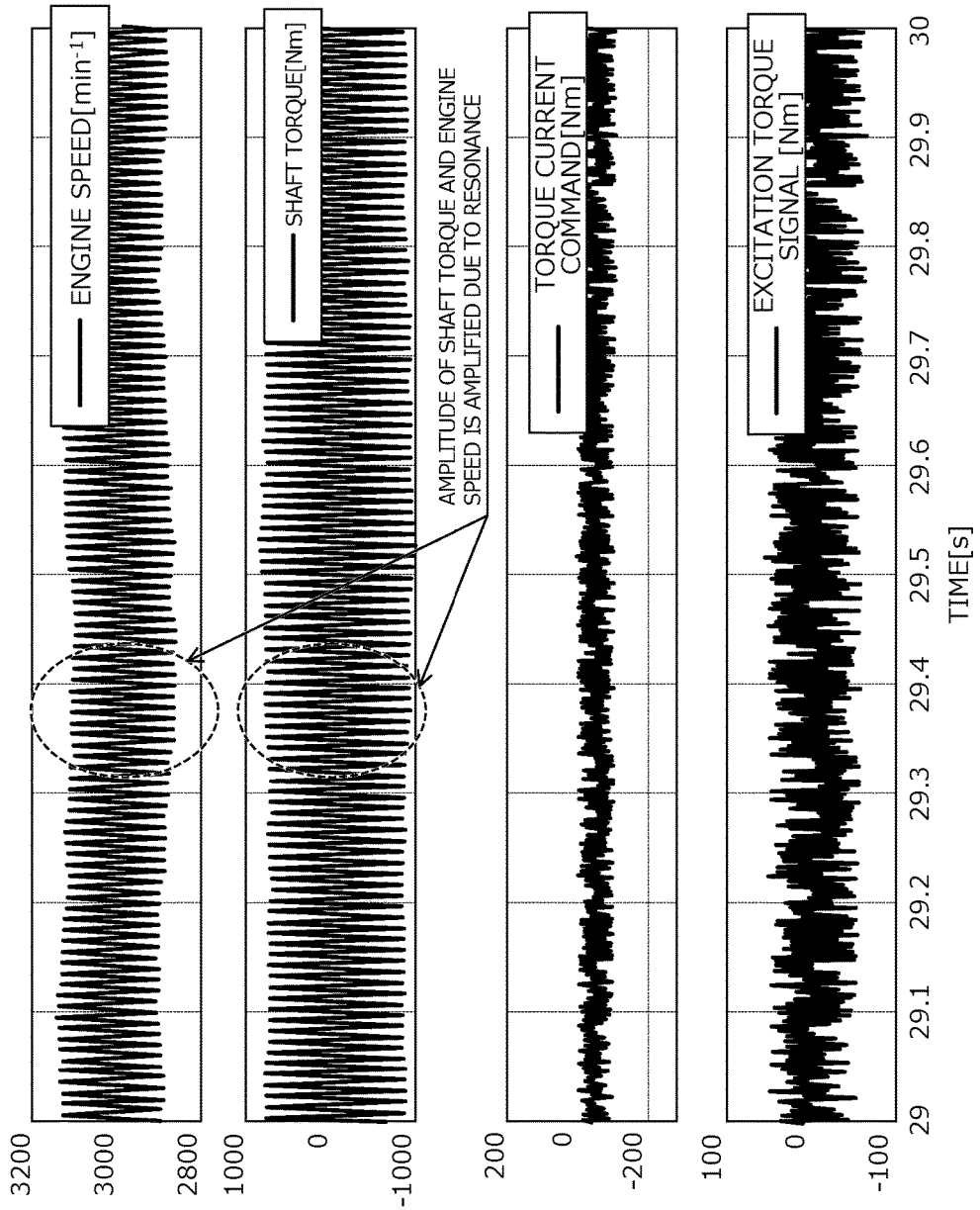
FIG. 4 is a time chart illustrating an engine speed, etc., in a case in which excitation control is performed by using a dynamometer control device of a comparative example.
Figure 5:
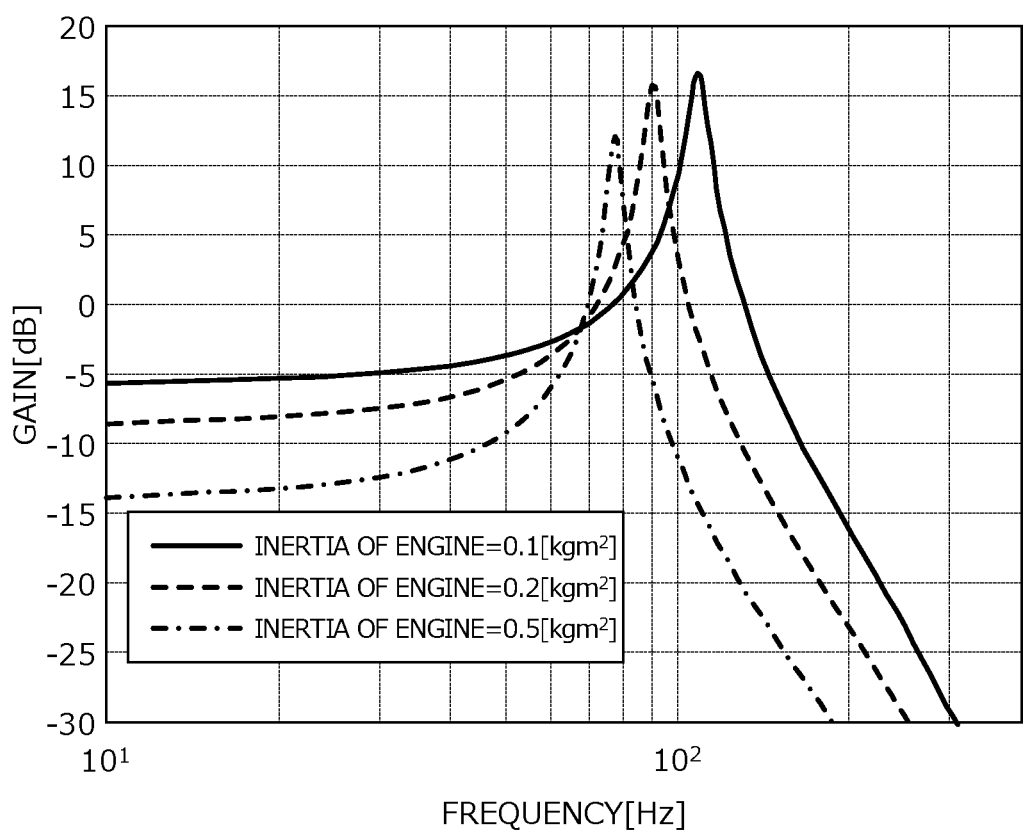
FIG. 5 is a Bode diagram of a transfer function from engine torque to shaft torque, in the case in which excitation control is performed by using the dynamometer control device of the comparative example.

FIGS. 4 and 5 are a time chart illustrating temporal variation of the engine speed, etc., and a Bode diagram illustrating gain characteristics of the transfer function from the engine torque to the shaft torque, respectively, in a case in which excitation control is performed by using a dynamometer control device of a comparative example. Here, the dynamometer control device of the comparative example refers to a device that generates a torque current command signal by using only excitation torque signals randomly generated by way of the excitation signal generation unit 61, in relation to the dynamometer control device 6 illustrated in FIG. 2.

Figure 6:
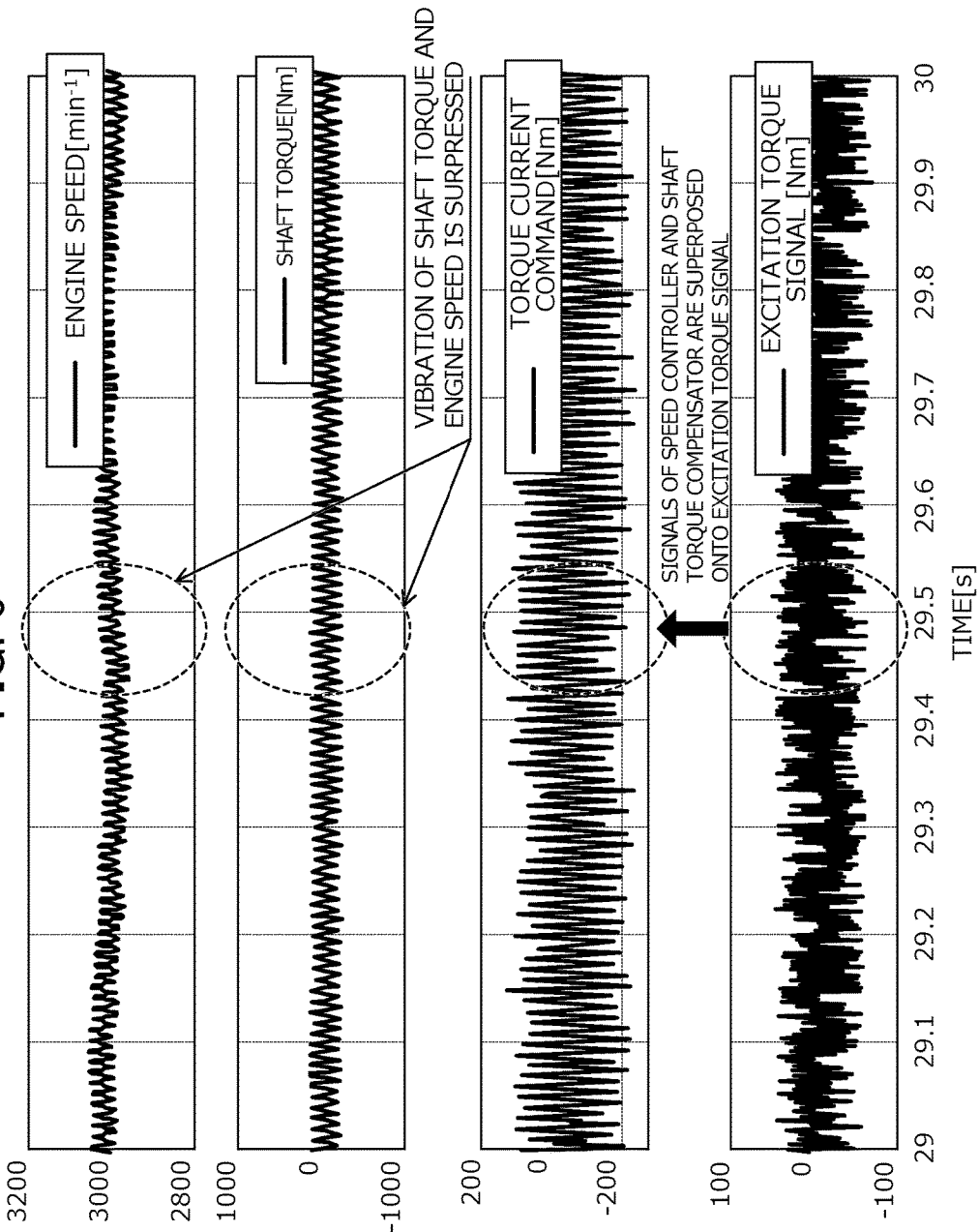
FIG. 6 is a time chart illustrating an engine speed, etc., in a case in which excitation control is performed by using the dynamometer control device of the embodiment.
Figure 7:
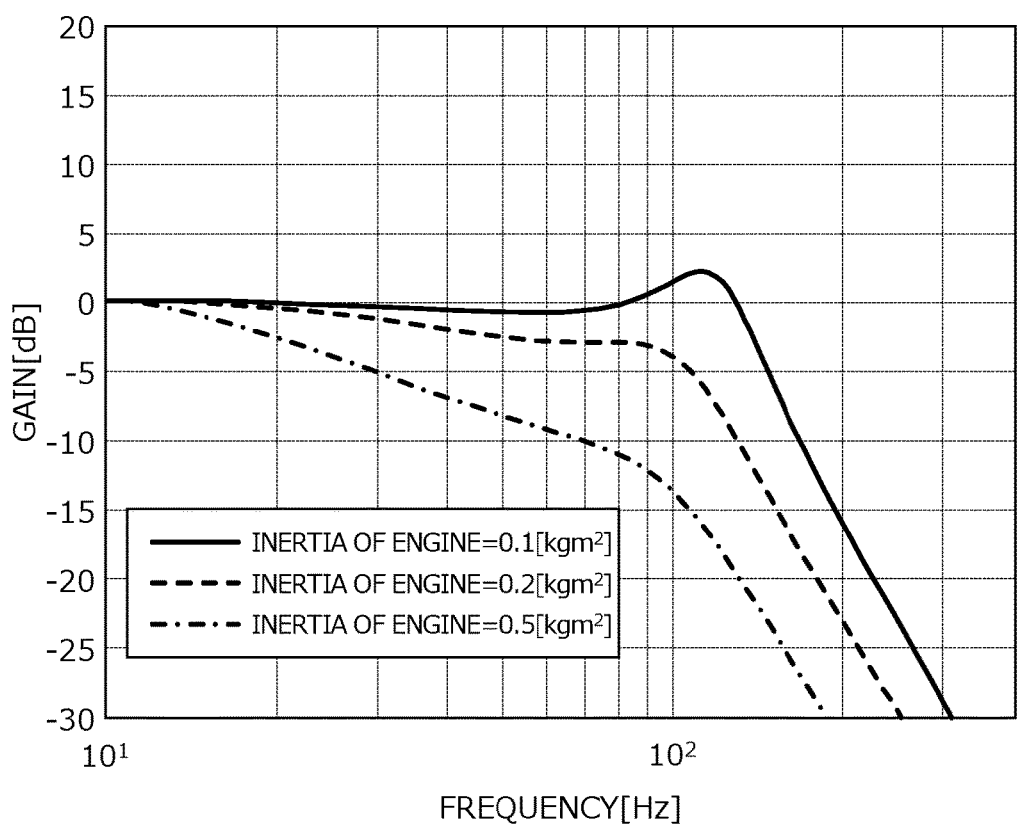
FIG. 7 is a Bode diagram of a transfer function from engine torque to shaft torque, in the case in which excitation control is performed by using the dynamometer control device of the embodiment.
Figure 8:
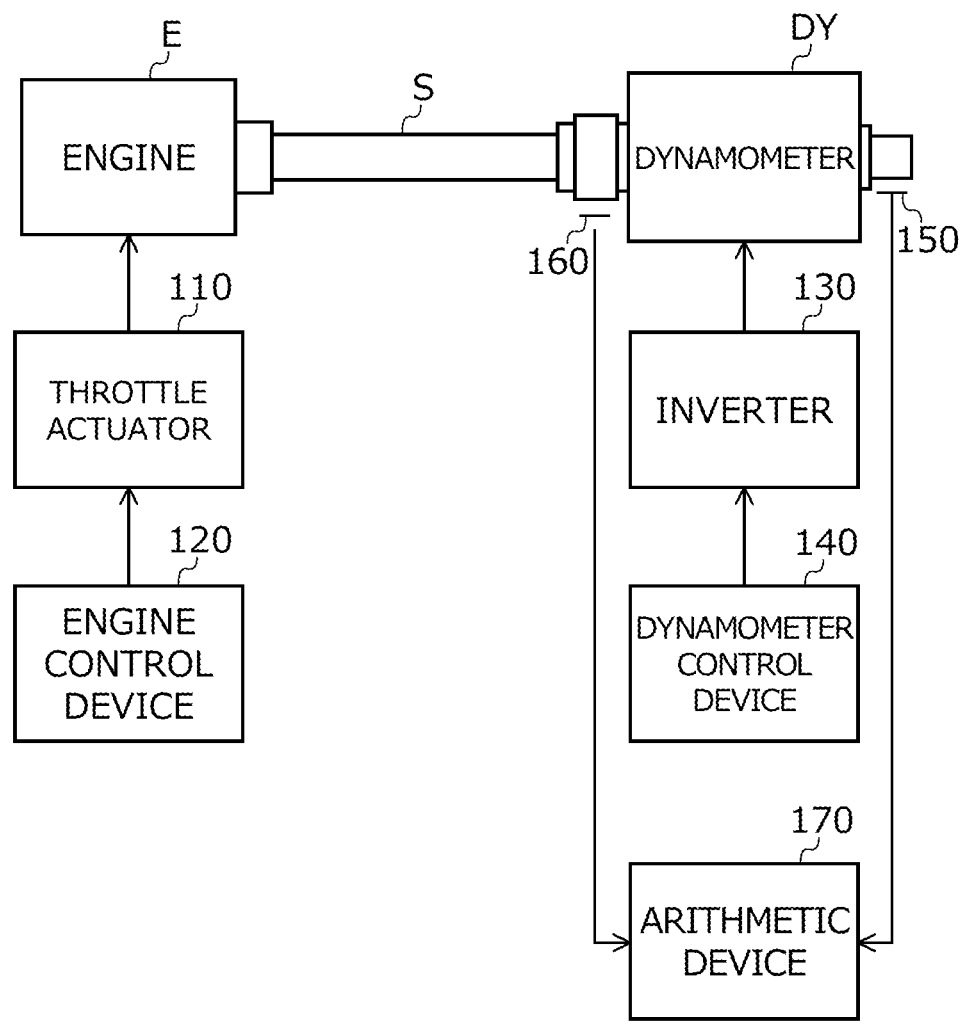
FIG. 8 is a diagram illustrating a configuration of a conventional test system.

FIGS. 6 and 7 are a diagram illustrating temporal variation of the engine speed, etc., and a Bode diagram illustrating gain characteristics of the transfer function from the engine torque to the shaft torque, respectively, in the case in which the excitation control is performed by using the dynamometer control device of the present invention illustrated in FIG. 2. Note that, in the example of FIGS. 6 and 7, the dynamometer rotation speed command value is equal to the target rotation speed of the engine. Further, in the measurement illustrated in FIGS. 4 to 7, the moment of inertia of an unknown engine is divided into three phases between 0.1 and 0.5 kg·m².

As illustrated in FIGS. 4 and 5, in the case in which excitation control is performed by using the conventional dynamometer control device, when the vibrational frequency of the engine torque becomes closer to the mechanical resonance frequency, the engine torque is amplified due to a resonance phenomenon, and the amplitude of vibration of the shaft torque and the engine speed increases. In contrast, as illustrated in FIGS. 6 and 7, in the case in which excitation control is performed by using the dynamometer control device of the present invention, signals of the speed controller and the shaft torque compensator as described above are superposed onto the excitation torque signals, whereby a resonance phenomenon is suppressed by way of these functions. Therefore, the amplitude of vibration of the shaft torque and the engine speed diminishes, as is evident from comparison between FIG. 4 and FIG. 6. Namely, the moment of inertia of the engine can be estimated with a high degree of accuracy, by using the dynamometer control device of the present invention.

EXPLANATION OF REFERENCE NUMERALS

1 . . . test system
D . . . dynamometer
E . . . engine (test piece)
S . . . shaft
5 . . . engine control device
6 . . . dynamometer control device (control device)
61 . . . excitation signal generation unit
62 . . . speed controller
63 . . . low-pass filter
64 . . . shaft torque compensator
65 . . . adder
7 . . . shaft torque sensor
8 . . . encoder (rotation speed detector)

The invention claimed is:

1. A dynamometer control device that generates a torque current command signal to a dynamometer connected to a test piece via a shaft, the dynamometer control device comprising:
   a rotation speed detector that detects a rotation speed of the dynamometer;
   a shaft torque sensor that detects shaft torque acting on the shaft;
   an excitation signal generation unit that generates a randomly or periodically fluctuating excitation signal;
   a speed controller that generates an input signal to the dynamometer such that a detection value of the rotation speed detector matches a predetermined command rotation speed;
   a shaft torque compensator that generates an input signal to the dynamometer such that vibration of the shaft is suppressed by using the detection value of the shaft torque sensor; and
   an adder that generates a torque current command signal by adding input signals generated by way of the speed controller and the shaft torque compensator to the excitation signal.

2. The dynamometer control device according to claim 1, wherein the shaft torque compensator generates an input signal to the dynamometer, by passing a detection signal of the shaft torque sensor through a high-pass filter or a bandpass filter, wherein a passband of the high-pass filter or the bandpass filter includes a resonance frequency of a mechanical system including the test piece and the dynamometer.

3. The dynamometer control device according to claim 1, wherein the control device further comprises a low-pass filter that attenuates a resonance frequency component of the mechanical system including the test piece and the dynamometer, from an output signal of the speed controller.

4. The dynamometer control device according to claim 3,
   wherein the speed controller generates an input signal to the dynamometer, in accordance with an I-P control law characterized by a proportional gain Kp and an integral gain Ki, in which a detection value of the rotation speed detector and the command rotation speed are inputs,
   wherein the low-pass filter is characterized by a cut-off frequency ωLPF/2π,
   wherein the proportional gain Kp, the integral gain Ki, and the cut-off frequency ωLPF/2π are defined so as to satisfy the following formula, and
   wherein, in the following formula, J is a sum of moments of inertia of the dynamometer and the test piece, or an estimated value thereof, and ωc is a positive real number $$Kp=J\cdot\omega c, Ki=(J\cdot\omega c^2)/3, \omega LPF=3\omega c.$$

5. An inertia moment estimation method for estimating a value of a moment of inertia of an engine by using a test system that includes:
   a dynamometer that is connected to an engine serving as a test piece via a shaft;
   a dynamometer control device that controls an output of the dynamometer;
   an engine control device that controls an output of the engine;
   a shaft torque sensor that detects shaft torque acting on the shaft; and
   a rotation speed detector that detects a rotation speed of the dynamometer;
   the method comprising:
   an excitation control step of performing excitation control of output torque of the dynamometer by way of the dynamometer control device, while maintaining a rotation speed of the engine at a predetermined target rotation speed by way of the engine control device;
   a data acquisition step of acquiring detection values of the shaft torque sensor and the rotation speed detector for a predetermined time frame while performing the excitation control step;
   a transfer function calculation step of calculating a transfer function, in which the shaft torque is an input and the rotation speed is an output, by using data acquired in the data acquisition step; and an estimation step of estimating a value of the moment of inertia of the engine by using the transfer function calculated in the transfer function calculation step, wherein, in the excitation control step, the excitation control is performed by using a control device according to claim 1 as the dynamometer control device.

\* \* \* \* \*